US010063466B2

(12) United States Patent
Sauer

(10) Patent No.: US 10,063,466 B2
(45) Date of Patent: Aug. 28, 2018

(54) METHOD AND APPARATUS FOR FACILITATING COMPATIBILITY BETWEEN COMMUNICATION NETWORKS

(71) Applicant: Coriant Operations, Inc., Naperville, IL (US)

(72) Inventor: Jaye M. Sauer, Naperville, IL (US)

(73) Assignee: Coriant Operations, Inc., Naperville, IL (US)

( * ) Notice: Subject to any disclaimer, the term of this patent is extended or adjusted under 35 U.S.C. 154(b) by 0 days.

(21) Appl. No.: 14/609,664

(22) Filed: Jan. 30, 2015

(65) Prior Publication Data

US 2015/0215202 A1    Jul. 30, 2015

Related U.S. Application Data

(60) Provisional application No. 61/933,797, filed on Jan. 30, 2014.

(51) Int. Cl.
*G01R 31/08*    (2006.01)
*H04L 12/28*    (2006.01)
(Continued)

(52) U.S. Cl.
CPC .......... *H04L 45/38* (2013.01); *H04L 41/0803* (2013.01); *H04L 69/18* (2013.01);
(Continued)

(58) Field of Classification Search
CPC .......... H04L 45/38; H04L 45/74; H04L 45/44; H04L 45/56; H04L 69/18; H04L 45/54
See application file for complete search history.

(56) References Cited

U.S. PATENT DOCUMENTS 7,720,061 B1 *  5/2010  Krishnaswamy ....... H04L 45/00
                                                      370/389
9,699,117 B2 *  7/2017  Koganti ................ H04L 49/351
(Continued)

FOREIGN PATENT DOCUMENTS

WO    WO 2013/031175    3/2013

OTHER PUBLICATIONS

International Search Report and Written Opinion of PCT/US2015/013765 dated Mar. 5, 2015 entitled "Method and Apparatus for Facilitating Compatibility Between Communication Networks".
(Continued)

*Primary Examiner* — Faruk Hamza
*Assistant Examiner* — Abu-Sayeed Haque
(74) *Attorney, Agent, or Firm* — Hamilton, Brook, Smith & Reynolds, P.C.

(57) ABSTRACT

The described embodiments provide techniques and architectures for enabling interoperability between legacy network systems and Software Defined Networking (SDN) systems. The embodiments add functionality to an SDN system to support interworking between an SDN controlled network, and a legacy network. When upgrading a legacy system to SDN, it may not be possible to upgrade all network components at once. The described embodiments facilitate the use of legacy network components together with SDN system components, by adding new functionality to the SDN data plane elements and control plane elements. The SDN forwarding network elements (NEs) terminate the physical links carrying legacy protocols that include combined data traffic and control information. The new functionality within the SDN forwarding NEs includes processing none or some of the control messages from a legacy NE within an SDN forwarding NE, and then forwarding the
(Continued)

remaining control messages to the controller under which that particular SDN forwarding NE is subtended.

23 Claims, 7 Drawing Sheets

(51) Int. Cl.
    *H04J 3/16*     (2006.01)
    *G06F 15/177*     (2006.01)
    *H04L 12/721*     (2013.01)
    *H04L 29/06*     (2006.01)
    *H04L 12/24*     (2006.01)
    *H04L 12/751*     (2013.01)
    *H04L 12/801*     (2013.01)
    *H04L 12/715*     (2013.01)

(52) U.S. Cl.
    CPC .............. *H04L 45/02* (2013.01); *H04L 45/64* (2013.01); *H04L 47/35* (2013.01)

(56) References Cited

U.S. PATENT DOCUMENTS

| | | | | |
|---|---|---|---|---|
| 2006/0209719 | A1* | 9/2006 | Previdi | H04L 12/4633 370/254 |
| 2008/0107126 | A1* | 5/2008 | Oguchi | H04L 41/0803 370/409 |
| 2008/0192700 | A1* | 8/2008 | Lee | H04W 36/02 370/331 |
| 2010/0085977 | A1* | 4/2010 | Khalid | H04L 12/4641 370/400 |
| 2013/0061034 | A1* | 3/2013 | Walheim, Sr. | H04L 63/0272 713/150 |
| 2014/0146664 | A1* | 5/2014 | Amante | H04L 45/50 370/228 |
| 2014/0177638 | A1* | 6/2014 | Bragg | H04L 45/50 370/395.5 |
| 2014/0269415 | A1* | 9/2014 | Banavalikar | H04L 12/185 370/254 |
| 2014/0280949 | A1* | 9/2014 | Anantharam | H04L 67/1008 709/226 |
| 2015/0117451 | A1* | 4/2015 | Kaneriya | H04L 45/745 370/392 |
| 2015/0149656 | A1* | 5/2015 | McMurry | H04L 45/00 709/238 |

OTHER PUBLICATIONS

Lin, et al. "Seamless Interworking of SDN and IP" SIGCOMM, ACM, pp. 475-476. Aug. 27, 2013.
Sharma, et al. "Demystifying Routing Services in Software-Defined Networking"; Aricent; pp. 1-10; Oct. 31, 2013.
Nadeau, et al. "SDN: Software Defined Networks", chapter 4, pp. 1-384; Aug. 22, 2013.
International Preliminary Report on Patentability for PCT/US2015/013765 dated Aug. 2, 2016 entitled "Method and Apparatus for Facilitating Compatibility Between Communication Networks".

* cited by examiner

METHOD AND APPARATUS FOR FACILITATING COMPATIBILITY BETWEEN COMMUNICATION NETWORKS

RELATED APPLICATIONS

This application claims the benefit of U.S. Provisional Application No. 61/933,797, filed on Jan. 30, 2014. The entire teachings of the above applications are incorporated herein by reference.

BACKGROUND OF THE INVENTION

A communications network allows a large group of widely-distributed users to communicate with one another. A network includes a variety of devices, connected together through a variety of media types, that work together to connect any user on the network with any other user.

Software-defined networking (SDN) allows network services to be managed by abstracting lower-level functions. An SDN controlled network divides network functionality into two components—a control plane and a data plane.

The control plane handles decisions about where data traffic is to be sent, while the data plane provides the underlying network components that forward the data traffic to destinations decided upon by the control plane. The control plane takes action through use of source and destination addresses and selects efficient paths through the network.

The control plane includes components such as controllers and orchestrators. The data plane includes components such as switches, routers and other network elements (referred to herein as NEs)

In legacy systems, the control plane and the data plane of a network generally exist within the same hardware. For example, switches and routers, two examples of network elements, typically provided both control plane and data plane functionality. Such network elements may analyze data packets as they are received to extract control plane (e.g., communications path) information, and use that information to convey the associated information along a proper media path.

SUMMARY OF THE INVENTION

In one aspect, an embodiment of the invention is a method of communicating network information, comprising: identifying, by a network element, a first control component within a received message. The message and the first control component is generated according to a first protocol. The method further includes forwarding, by the network element to a control plane element, the first control component encapsulated within a second protocol. The method also includes configuring, by the network element, one or more message flow paths through the network element as directed by a second control component. The second control component is generated according to a second protocol and provided by the control plane element.

In another aspect, an embodiment of the invention is a method of communicating network information. The method may include generating, by a control plane element, a first control component associated with a first communications protocol. The first control component is derived from a second control component associated with a second communications protocol. The method further includes distributing the first control component to one or more network elements. The first control component may be configured to designate one or more message flow paths through the one or more network elements.

In another aspect, an embodiment of the invention is a communications network architecture. The architecture may include a first network element belonging to a first network. The first network element is configured to identify a first control component having been generated according to a first protocol. The first network may be a legacy network, and the second network may be an SDN network. The architecture further includes a control plane element associated with the first network and a second network. The control plane element is configured to derive a second control component from the first control component. The first network element is further configured to receive the second control component and use the second control component to configure one or more message flow paths through the first network element.

In another aspect, an embodiment of the invention is an apparatus for communicating network information. The apparatus may include a network element configured to identify a first control component within a received message. The message and the first control component are generated according to a first protocol. The network element may further be configured to forward to a control plane element, the first control component encapsulated within a second protocol, and configure one or more message flow paths through the network element as directed by a second control component. The second control component may be generated according to a second protocol and provided by the control plane element.

In another aspect, an embodiment of the invention is an apparatus for communicating network information. The apparatus may include a control plane element configured to generate a first control component associated with a first communications protocol. The first control component may be derived from a second control component associated with a second communications protocol. The control plane element may be further configured to distribute the first control component to one or more network elements. The first control component may be configured to designate one or more message flow paths through the one or more network elements.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A relatively new concept, known as Software-Defined Networking (SDN), physically decouples the control plane from the data plane. With SDN, control plane functionality resides in components such as packet controllers, optical controllers and network orchestrators. SDN allows network administrators to have programmable central control of network traffic via a controller without requiring physical access to the network's switches.

SDN requires a method of communication between the control plane and the data plane. OpenFlow protocol is one such method of communication.

A description of example embodiments of the invention follows.

Example embodiments described below provide techniques and architectures for enabling interoperability between legacy network systems and SDN systems.

The described embodiments add functionality to an SDN network system to support interworking between an SDN controlled network, and an existing non-SDN network (also referred to as a legacy network) that relies on distributed control plane protocols. Examples of distributed control plane protocols include Border Gateway Protocol (BGP) and Open Shortest Path First (OSPF) in packet networks, and Generalized Multi-Protocol Label Switching (GMPLS) in optical networks.

When upgrading a legacy system to an SDN system, it may not be possible to upgrade all network components at once. The described embodiments facilitate the use of legacy network components together with SDN system components by adding new functionality to the SDN forwarding network elements (i.e., SDN data plane elements) and the SDN controllers and orchestrators (i.e., control plane elements).

The SDN forwarding network elements (NEs) terminate the physical links carrying legacy protocols that include combined data traffic and control information.

The new functionality within the SDN forwarding NEs includes processing none or some of the control messages from a legacy NE within an SDN forwarding NE, and then forwarding the remaining control messages to the controller under which that particular SDN forwarding NE is subtended.

The new functionality within the controller may include processing of legacy control messages along with the SDN control messages required for SDN control. Such processing may include mapping and translating legacy messages into SDN messages and actions (e.g., setting up a new connection, or storing a new forwarding topology entry).

The orchestrator may be modified to handle the reception of messages that a subtending controller cannot handle, such as packet protocol messages received by an optical controller. Such an orchestrator can direct those messages to the appropriate controller. Some embodiments use both controllers and orchestrators, while other embodiments operate with controllers but not orchestrators. In such embodiments, the orchestrator functionality may be distributed across the controllers.

Figure 1A:
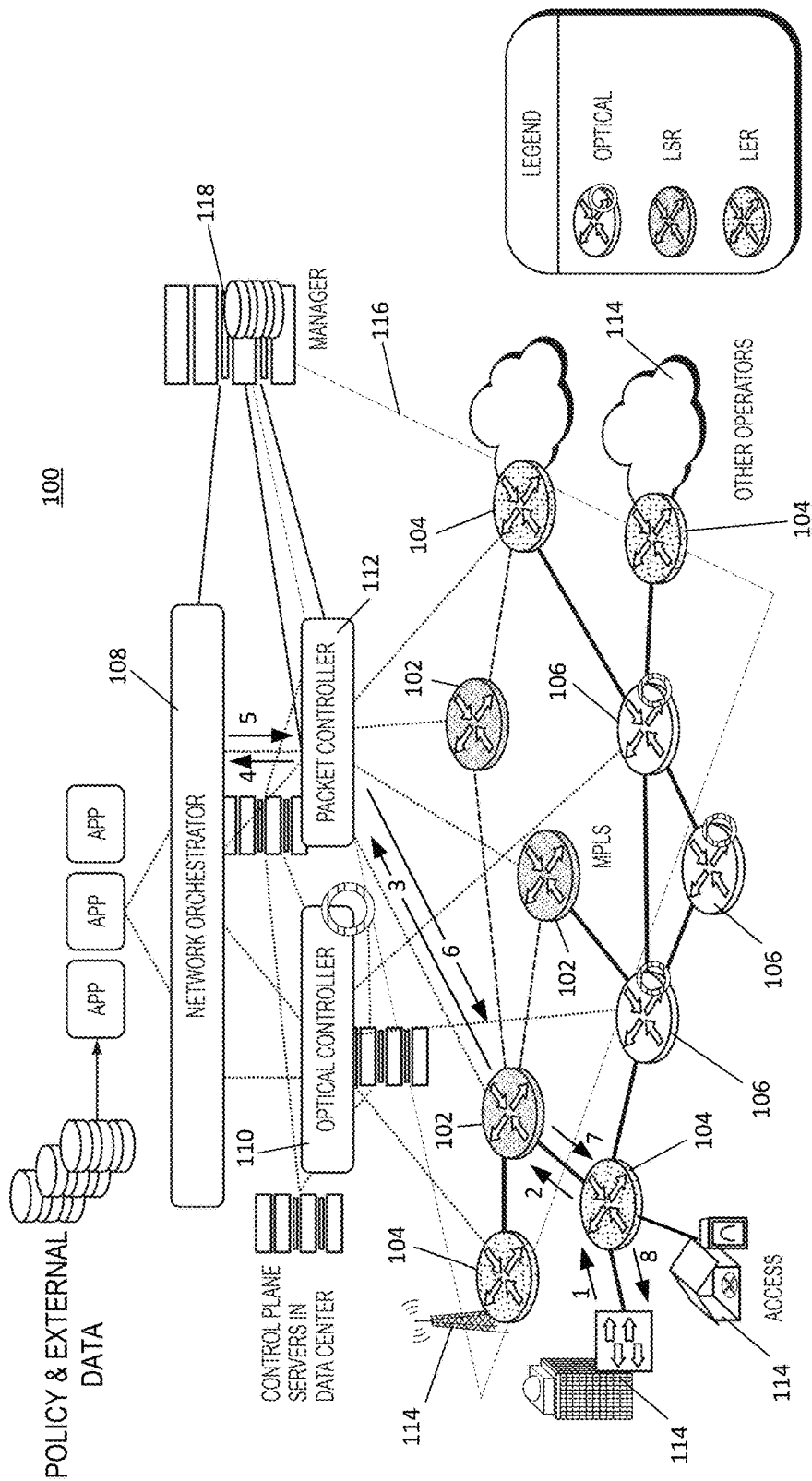
FIG. 1A is a network diagram that illustrates a network architecture according to described embodiments.

FIG. 1A is a diagram of an example network architecture 100, constructed and arranged according to embodiments of the invention. The example embodiment includes Label Switch Routers (LSR) 102, Label Edge Routers (LER) 104 and optical routers 106. The network architecture 100 further includes a network orchestrator 108, optical controller 110, packet controller 112, and various external network elements 114, which are sources of input to the LERs 104 and optical routers 106. FIG. 1A further defines a network region 116 under the overall control of a network manager 118.

The LSRs 104, LERs 106, optical routers 108, network orchestrator 108, optical controller 110 and packet controller 112 are all part of an SDN architecture, and as such communicate and transfer data using one or more SDN protocols (e.g., OpenFlow).

Some of the sources of input 114 to the LERs 104, however, may use legacy protocols such as:

1. IP/MPLS—BGP, IS-IS, OSPF, RSUP(TE), etc.
2. Ethernet—Spanning tree, etc.
3. Optical—GMPLS, where IP/MPLS is the Internet Protocol/Multi-Protocol Label Switched Path; IS-IS is the Intermediate System to Intermediate System protocol; OSPF is the Open Shortest Path First protocol; RSUP(TE) is the Reliable SAP Update Protocol (Traffic Engineering).

FIG. 1A shows message flow according to embodiments described herein, using arrows with accompanying numbers 1-8. This message flow is described in more detail through FIGS. 1Ba and 1C below.

Figure 1B:
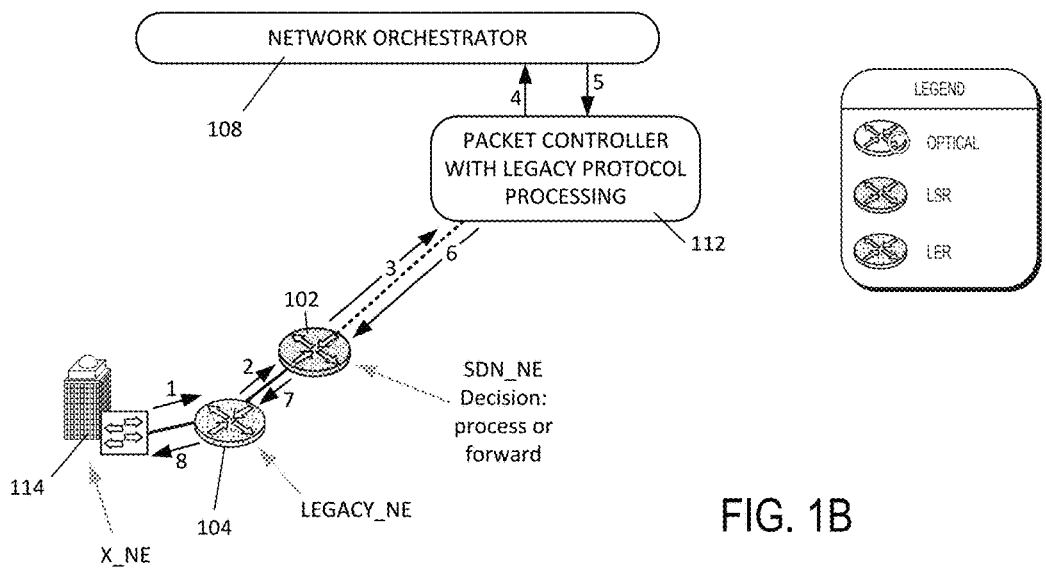
FIG. 1B is a diagram illustrating message flow through particular network components of FIG. 1A according to one of the described embodiments.
Figure 1C:
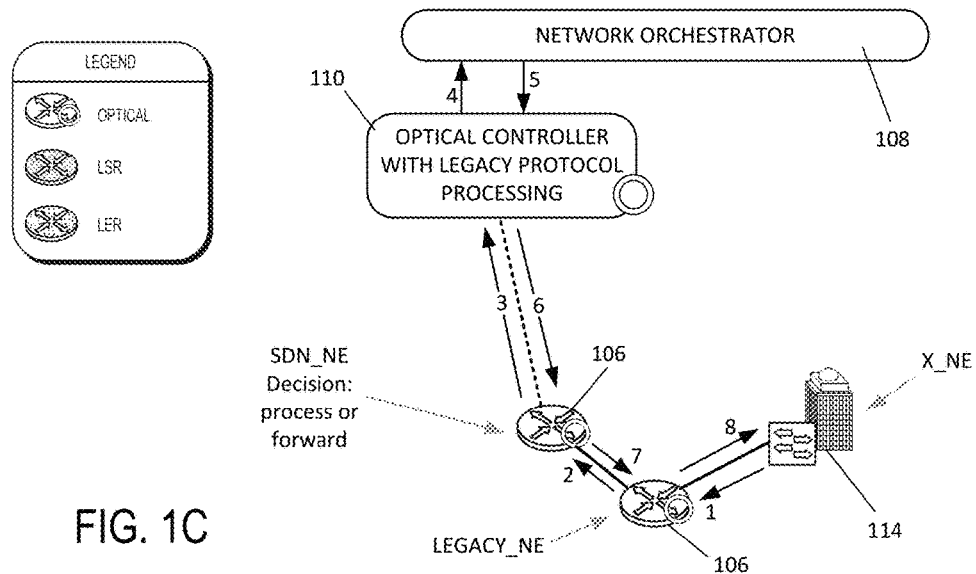
FIG. 1C is a diagram illustrating message flow through particular network components of FIG. 1A according to one of the described embodiments.

FIGS. 1B and 1C illustrate message flow through particular network components of FIG. 1A according to one of the described embodiments. These figures show eight information transfers, each depicted by a numbered arrow. FIG. 1B shows message flow for packet data, and FIG. 1C shows message flow for optical data.

Referring first to FIG. 1B, for packet data, the message flow is as follows: (1) An external network element (referred to as X_NE herein) 114 transfers a legacy protocol control message to a legacy network element 104 (referred to as LEGACY_NE herein). (2) The LEGACY_NE updates its forwarding table based on the legacy protocol message, and transfers the legacy protocol message to a forwarding network element. This forwarding network element, referred to herein as a SDN_NE, is a SDN-based system component that has been revised to perform one or more elements of the described embodiments.

The SDN_NE 102 evaluates the legacy protocol message and determines whether or not to process the message locally. The message flow shown in FIG. 1B occurs when the SDN_NE 102 decides to not process the message locally, in which case the SDN_NE 102 encapsulates the legacy protocol message in an SDN protocol message (e.g., OpenFlow) and (3) sends the encapsulated legacy message to a packet controller 112. The packet controller 112 extracts and evaluates the encapsulated legacy protocol message. Based on the legacy protocol message contents, the packet controller 112 updates its routing table and determines whether or not the network orchestrator 108 should be involved in further processing. Orchestrator involvement may be required when the message may concern other controllers, because few or no communications paths exist between controllers.

Message flow elements (4) and (5) depict message flow that occurs when the orchestrator is involved in further processing. In the event that the legacy protocol message makes it clear that it concerns no other controllers, the packet controller 112 may determine that orchestrator involvement may not be required, so that message flow elements (4) and (5) may be skipped.

The packet controller 102 may (6) send new forwarding information, based on the legacy protocol message, to the SDN_NE 102. The SDN_NE 102 uses the new forwarding information to update its forwarding tables.

Message flow elements (7) and (8) represent confirmation messages flowing back to the LEGACY_NE and the X_NE, which would normally occur in a distributed control system (i.e., a legacy network system). Message flow elements (7) and (8) may be necessary to provide a smooth transition between legacy components and components constructed and arranged according to the described embodiments.

FIG. 1C depicts a similar message flow as that shown in FIG. 1B, but FIG. 1C shows the message flow for optical media components. The message flow elements (1) through (8) described for FIG. 1B are essentially the same, except that in FIG. 1C the LEGACY_NE and the SDN_NE functionalities are performed by optical switches 106.

Figure 2:
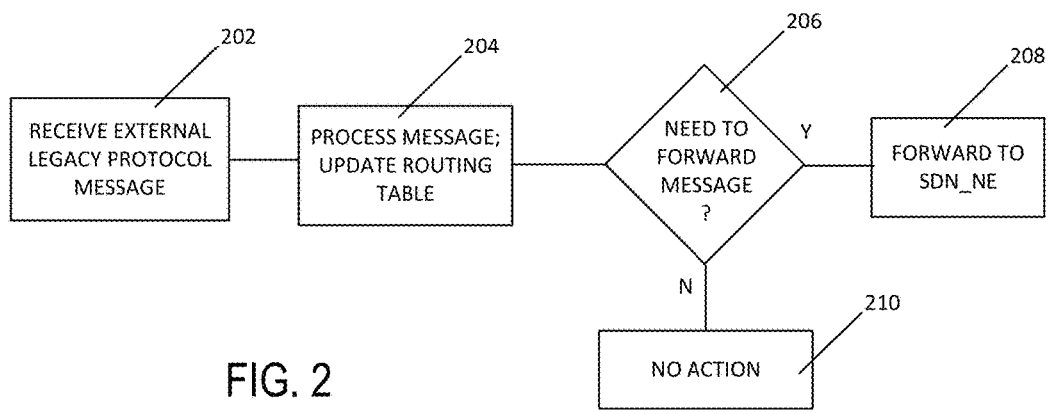
FIG. 2 is a flow diagram of an embodiment of actions in a legacy network element.

FIG. 2 shows a flow diagram of actions that may occur in a legacy network element (LEGACY_NE) 104, 106, according to the described embodiments. The LEGACY_NE receives 202 a legacy protocol message from an external source, processes 204 the message, and updates its routing table. If the LEGACY_NE determines, based on the message content, that the received message needs to be forwarded, the LEGACY_NE forwards 208 the message to the SDN_NE 102, 106. If the LEGACY_NE determines that the received message does not need to be forwarded (because, for example, the LEGACY_NE is the destination of the message), the LEGACY_NE takes no further action 210 with respect to the SDN_NE 102,106.

Figure 3:
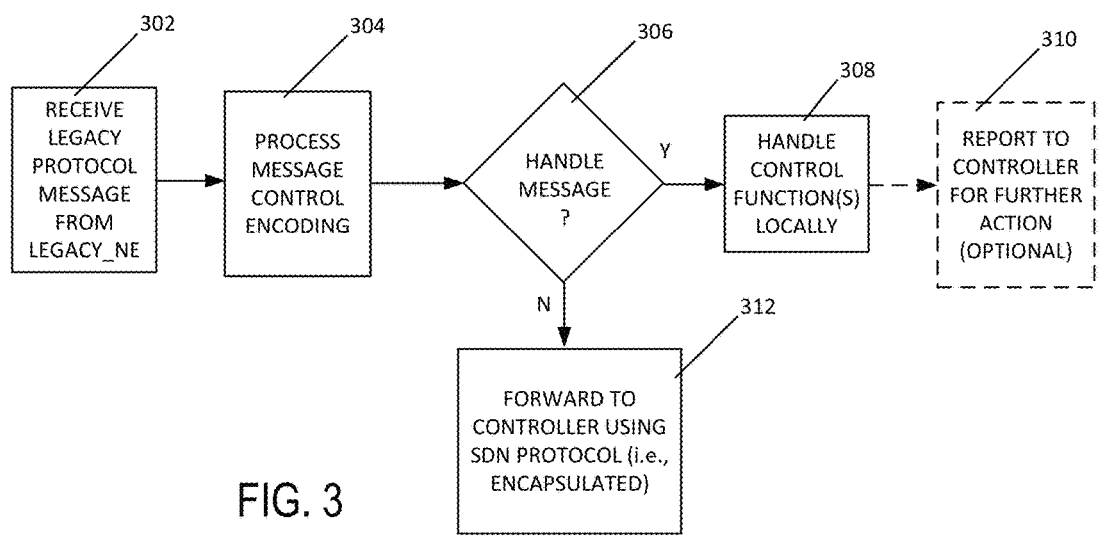
FIG. 3 is a flow diagram of an embodiment of actions in a SDN forwarding network element according to the invention.

FIG. 3 shows a flow diagram depicting actions that may occur in an SDN forwarding network element (SDN_NE) 102, 106, according to the described embodiments.

The SDN_NE receives 302 the legacy protocol message from the LEGACY_NE. The SDN_NE processes 304 the legacy protocol message to extract and interpret the control encoding.

The SDN_NE determines 306, based on the control encoding content, whether to handle the legacy protocol message locally. An SDN forwarding network element may be programmed to handle a control message locally in certain cases of high message volume. Such programming may cause the SDN_NE to evaluate frequency of message type to allow for scaling. As an example of handling the control message locally, the SDN_NE may configure one or more message flow paths according to a scaling parameter. The scaling parameter may be a logical concept that indicates the need for local network element processing of a protocol message. A high frequency (e.g., link status) message would have a high scale parameter value. Locally handling this type of message would lower the computational and networking load on the controller 110, 112 and the overall control network. In one embodiment, a set of messages may always be handled in the NE and another set may always be forwarded. In another embodiment the scaling parameter may be associated with a variable local set based upon network or controller load at a given point in time.

If the determination is made to handle the control functions locally, the SDN_NE performs 308 the appropriate control functions, according to the message content, and may report 310 the performance to the controller 110, 112 for instructions regarding further action.

If the determination is made to not handle the control functions locally, the SDN_NE encapsulates the legacy protocol message in an SDN protocol message (e.g., OpenFlow), and forwards 312 the SDN protocol message, containing the encapsulated legacy protocol message, to the controller 110, 112.

Figure 4:
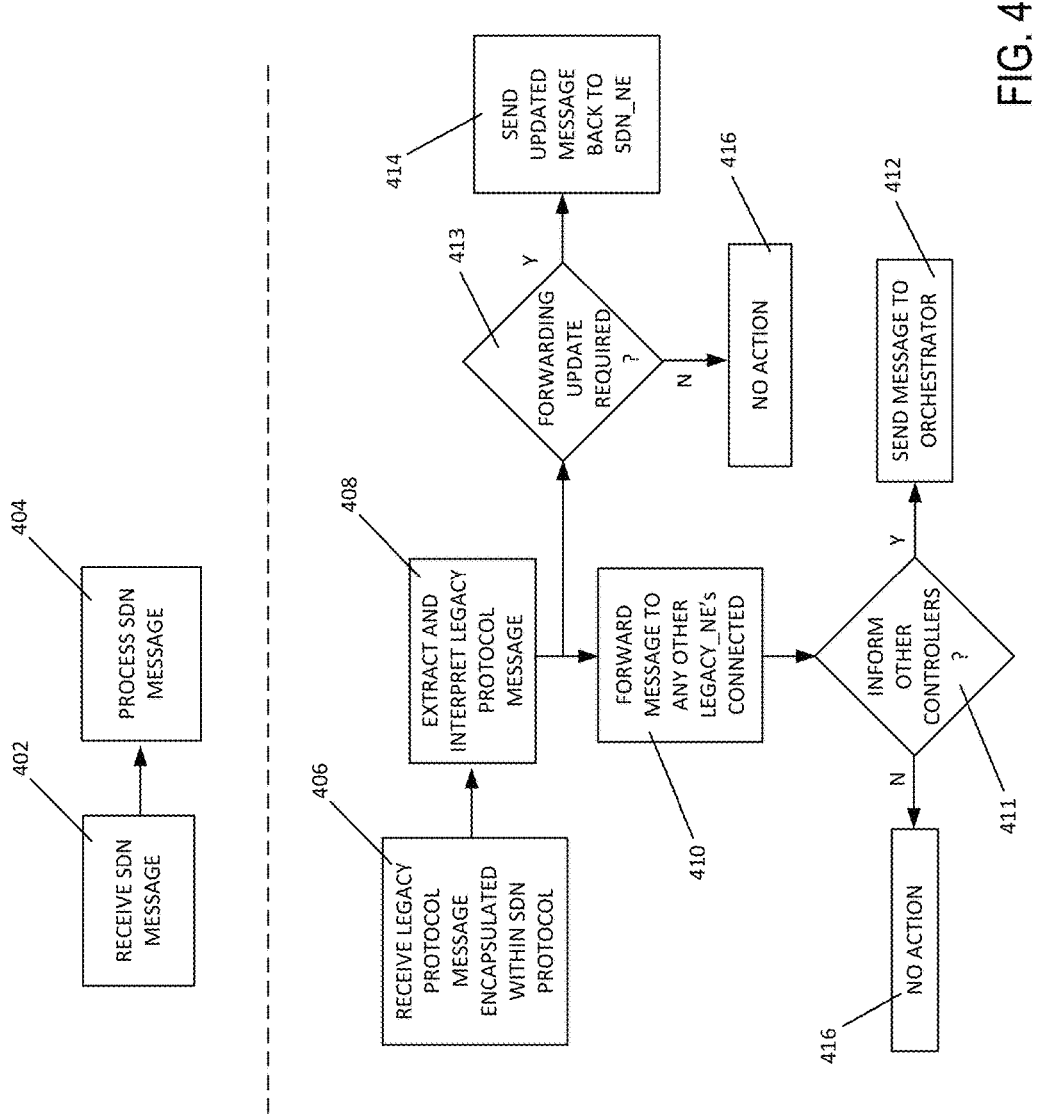
FIG. 4 is a flow diagram of an embodiment of actions in an SDN controller according to the invention.

FIG. 4 shows a flow diagram of actions that may occur in an SDN controller (optical controller 110 or packet controller 112), according to the described embodiments.

An SDN controller, constructed and arranged according to the described embodiments, may handle an SDN protocol message or a legacy protocol message encapsulated within an SDN protocol message. FIG. 4 includes a dotted line, above which shows processing for pure SDN protocol messages, and below which shows processing for a legacy protocol message encapsulated within an SDN protocol message.

When the controller receives 402 an SDN protocol message without legacy encapsulation, the controller interprets and processes 404 the SDN protocol message according to normal SDN practices.

When the controller receives 406 a legacy protocol message encapsulated in an SDN protocol message, the controller extracts and interprets 408 the legacy protocol message. The controller forwards 410 the message to any other legacy network elements that are connected to it. If the controller decides 411, based on the message content, that other controllers should be informed of the message, the controller sends 412 an appropriate message to the orchestrator to which the controller is subtended. If the controller decides 411 that other controllers need not be informed, the controller takes no further action 416 regarding the message.

If the controller determines 413 that a forwarding update is required, the controller sends 414 a forwarding update message back to the SDN_NE that provided the encapsulated message. If no forwarding update is required, no further action 416 is taken.

Figure 5:
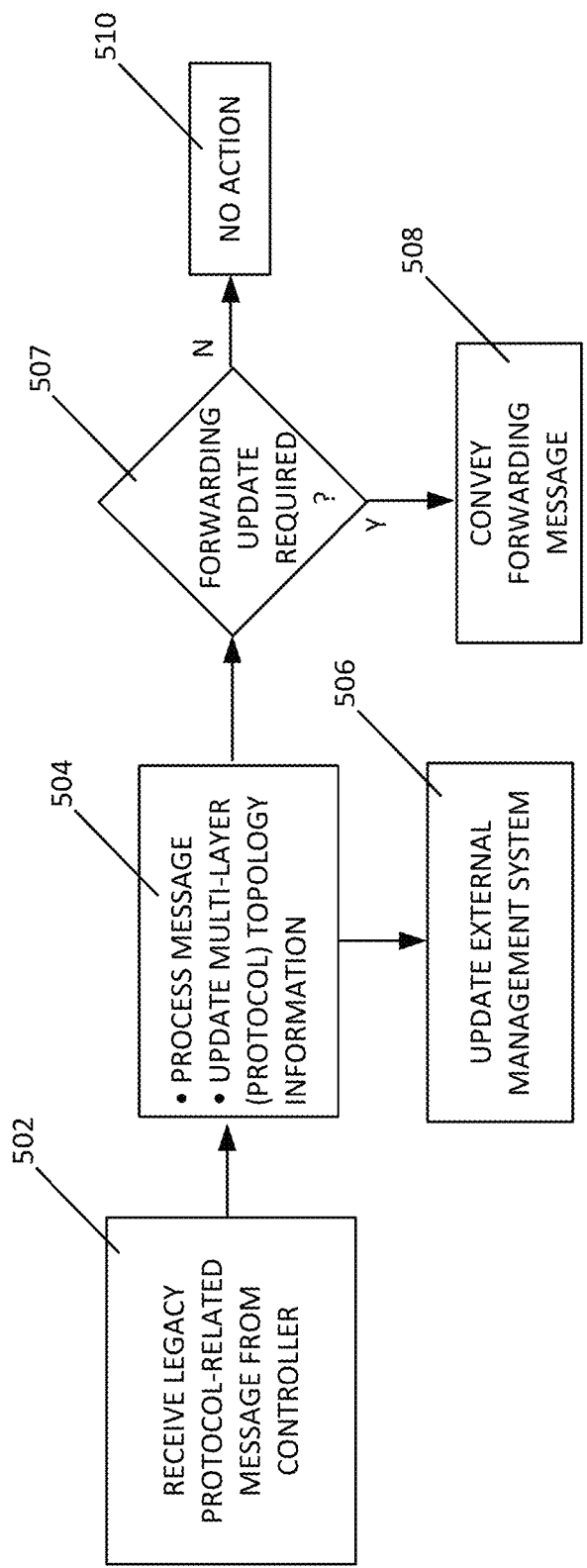
FIG. 5 is a flow diagram of an embodiment of actions in an SDN orchestrator according to the invention.

FIG. 5 shows a flow diagram of actions that may occur in an SDN orchestrator 108, according to the described embodiments.

When the orchestrator receives 502 a message related to a legacy protocol communication, the orchestrator processes 504 the message and updates its topology information across all of the protocols the orchestrator is capable of supporting. The orchestrator may also update 506 the external management system with which the orchestrator communicates and coordinates.

When the orchestrator determines 507 that a forwarding update is required, the orchestrator conveys 508 a forwarding message to its subtended controllers. When no forwarding update is required, the orchestrator takes no further action 510.

Figure 6:
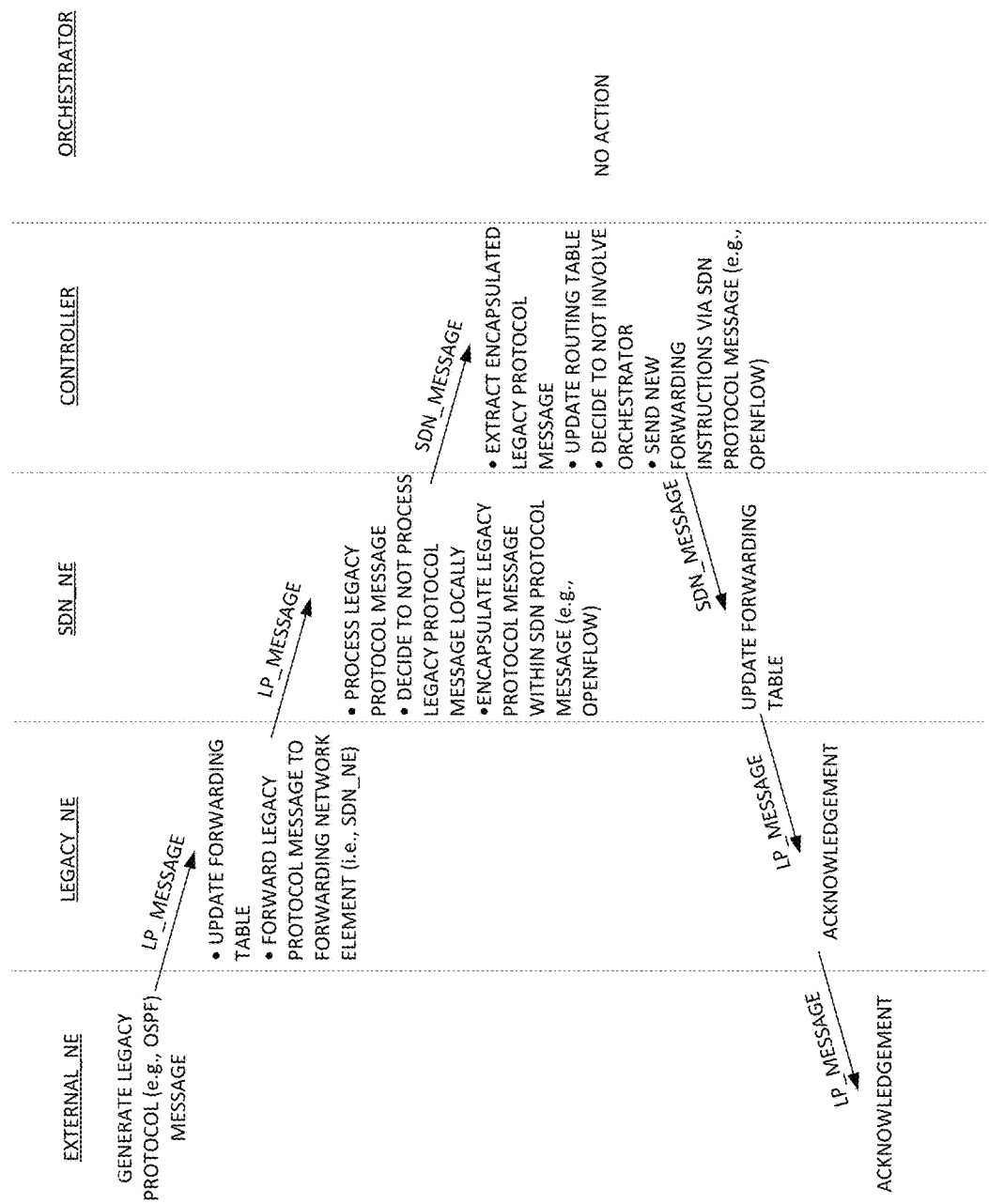
FIG. 6 is a flow diagram of an embodiment of actions involving multiple network components according to the invention.

FIG. 6 illustrates, in a single diagram across multiple network elements, an example of the processing that is described in FIGS. 1A through 5. In this example, certain decisions are made the results in a specific message flow. For example, the SDN_NE determines, based on the legacy protocol message (LP_MESSAGE), that the SDN_NE will not process the legacy protocol message locally; as a result, the SDN_NE encapsulates the legacy protocol message within an SDN-based message (SDN_MESSAGE) and sends it to the controller to which it is subtended. The controller, in turn, decides based on the content of the legacy protocol message, that the orchestrator need not be involved.

Figure 7:
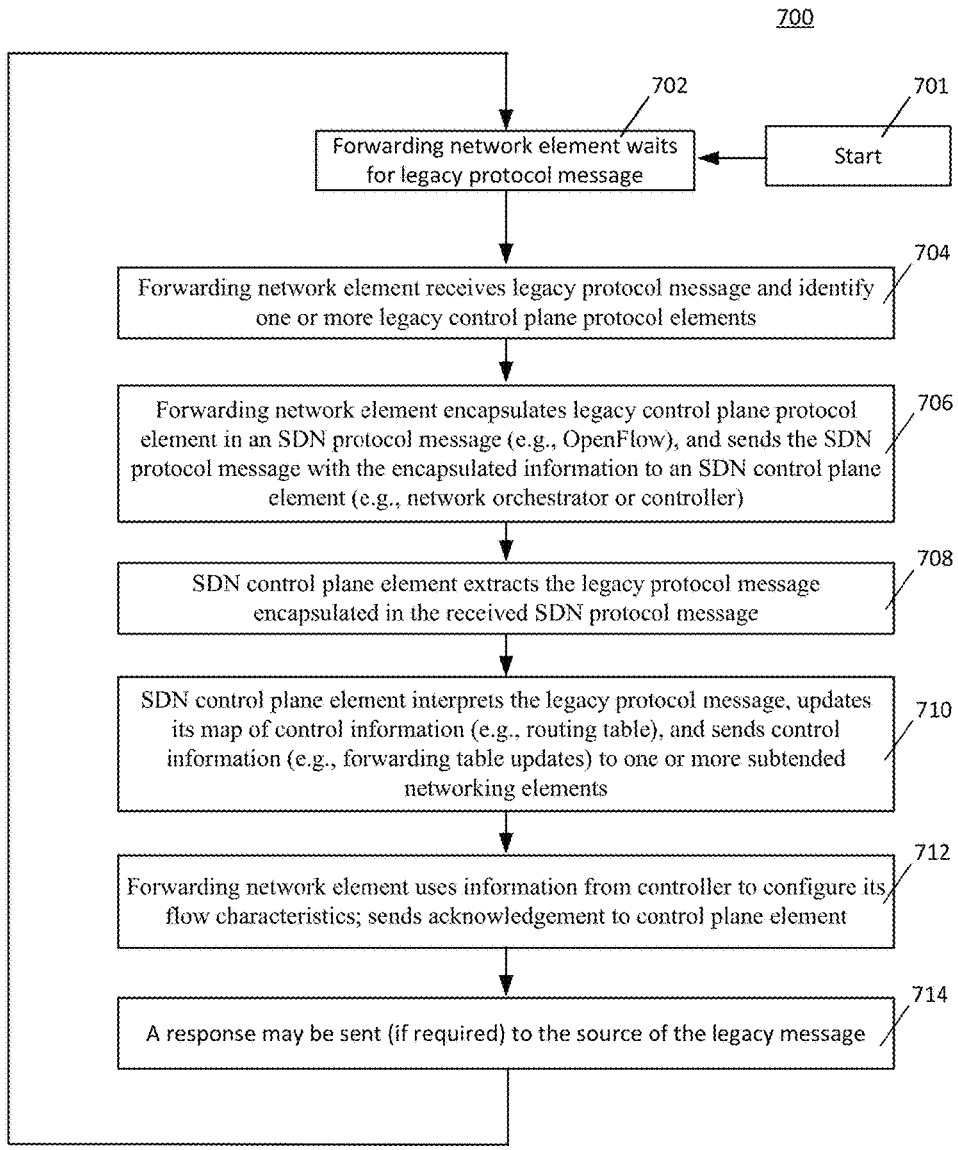
FIG. 7 is a flow diagram of an embodiment of actions to process a legacy message within an SDN system according to the invention.

FIG. 7 is a flow diagram that illustrates a procedure 700 for receiving, processing and directing a message from a legacy system, within an SDN architecture, according to an example of the described embodiments.

The procedure 700 begins 701 as a forwarding network element, such as the SDN_NE 102 of FIG. 1B, waits 702 for a legacy protocol message to arrive. When a legacy message arrives, the forwarding network element may identify 704 one or more legacy control plane protocol elements within the legacy protocol message.

The forwarding network element may then encapsulate 706 the identified legacy control plane protocol element in an SDN protocol message (e.g., OpenFlow), and send the SDN protocol message with the encapsulated information to an SDN control plane element, such as a network orchestrator or controller. In some embodiments, the forwarding network element may encapsulate the entire legacy protocol message, or some portion thereof, rather than just the legacy control plane protocol element.

The SDN control plane element may extract 708 the encapsulated information (i.e., legacy control plane protocol element or entire legacy protocol message) from the SDN protocol message.

The SDN control plane element may interpret 710 the legacy protocol message, update its map of control information and send forwarding control information (e.g., forwarding table updates) to one or more subtended networking elements.

The map of control information of the SDN control plane element may include, for example, a routing table, although other control data storage architectures may alternatively be used.

The forwarding control information may include, for example, forwarding table updates for the forwarding network elements to use, although other forms of forwarding control data may alternatively be used.

The forwarding network element may use 712 the information from the controller to configure its flow characteristics. The forwarding network element may send an acknowledgement to control plane element. Further, the forwarding network element may send 714 a response to the source of the legacy message.

Once the forwarding network element completes processing of the legacy protocol message, the forwarding network element may return to waiting for a legacy protocol message to arrive.

In view of the foregoing, various embodiments should be understood. For example, one embodiment of the present invention is a method of communicating network information, comprising: identifying, by a network element, a first control component within a received message. The message and the first control component is generated according to a first protocol. The method further includes forwarding, by the network element to a control plane element, the first control component encapsulated within a second protocol. The method also includes configuring, by the network element, one or more message flow paths through the network element as directed by a second control component. The second control component is generated according to a second protocol and provided by the control plane element.

In one embodiment, the second control element is derived from the first control component.

Another embodiment further comprises configuring, by the network element, one or more message flow paths as directed by the first control component. Another embodiment includes, by the network element, directing a first data block according to the first control component, and directing a second data block according to the second control component. Another embodiment further includes forwarding, by the network element, to the source of the received message, a message generated according to the first protocol.

One embodiment includes configuring, by a second network element, one or more flow paths through the second network element according to the control component generated according to the second protocol. In one embodiment, the first protocol is a legacy protocol and the second protocol is a non-legacy protocol, the legacy protocol being one or more of BGP, IS-IS, OSPF, RSUP(TE), Ethernet spanning tree, and GMPLS. The non-legacy protocol may be a Software-Defined Networking (SDN) protocol. The SDN protocol may be the OpenFlow protocol.

In one embodiment, the control plane element includes one or more controllers. In another embodiment, the control plane element includes one or more orchestrators, the one or more controllers subtending the one or more orchestrators. One embodiment further includes forwarding, by at least one of the orchestrators, the first control component to the one or more controllers.

In one embodiment, the control plane element is an orchestrator and one or more controllers, the one or more controllers subtending the orchestrator. One embodiment further includes forwarding, by the orchestrator, the first control component to the one or more controllers.

One embodiment further includes acknowledging, by the network element, receipt of the second control component generated according to the second protocol.

One embodiment of the present invention is a method of communicating network information. The method may include generating, by a control plane element, a first control component associated with a first communications protocol. The first control component is derived from a second control component associated with a second communications protocol. The method further includes distributing the first control component to one or more network elements. The first control component may be configured to designate one or more message flow paths through the one or more network elements.

In one embodiment, the second control component is provided by a forwarding network element, the second control component being embedded within a message associated with the first protocol.

In another embodiment, the control plane element is an orchestrator and one or more controllers, the one or more controllers subtending the orchestrator.

One embodiment further includes forwarding, by the orchestrator, the first control component to the one or more controllers.

One embodiment of the present invention is a communications network architecture. The architecture may include a first network element belonging to a first network. The first network element is configured to identify a first control component having been generated according to a first protocol. The first network may be a legacy network, and the second network may be an SDN network. The architecture further includes a control plane element associated with the first network and a second network. The control plane element is configured to derive a second control component from the first control component. The first network element is further configured to receive the second control component and use the second control component to configure one or more message flow paths through the first network element.

In one embodiment, a second network element belonging to the second network is configured to receive the second control component and use the second control component to configure one or more message flow paths through the second network element.

Another embodiment further includes a third network element belonging to the first network. The third network element is configured to receive the second control component and use the second control component to configure one or more message flow paths through the third network element.

In another embodiment, the control plane element is an orchestrator and one or more controllers, the one or more controllers subtending the orchestrator.

One embodiment of the present invention is an apparatus for communicating network information. The apparatus may include a network element configured to identify a first control component within a received message. The message and the first control component are generated according to a first protocol. The network element may further be configured to forward to a control plane element, the first control component encapsulated within a second protocol, and configure one or more message flow paths through the network element as directed by a second control component. The second control component may be generated according to a second protocol and provided by the control plane element.

One embodiment of the present invention is an apparatus for communicating network information. The apparatus may include a control plane element configured to generate a first control component associated with a first communications protocol. The first control component may be derived from a second control component associated with a second communications protocol. The control plane element may be further configured to distribute the first control component to one or more network elements. The first control component may be configured to designate one or more message flow paths through the one or more network elements.

It will be apparent that one or more embodiments, described herein, may be implemented in many different forms of software and hardware. Software code and/or specialized hardware used to implement embodiments described herein is not limiting of the invention. Thus, the operation and behavior of embodiments were described without reference to the specific software code and/or specialized hardware—it being understood that one would be able to design software and/or hardware to implement the embodiments based on the description herein.

Further, certain embodiments of the invention may be implemented as logic that performs one or more functions. This logic may be hardware-based, software-based, or a combination of hardware-based and software-based. Some or all of the logic may be stored on one or more tangible computer-readable storage media and may include computer-executable instructions that may be executed by a controller or processor. The computer-executable instructions may include instructions that implement one or more embodiments of the invention. The tangible computer-readable storage media may be volatile or non-volatile and may include, for example, flash memories, dynamic memories, removable disks, and non-removable disks.

While this invention has been particularly shown and described with references to example embodiments thereof, it will be understood by those skilled in the art that various changes in form and details may be made therein without departing from the scope of the invention encompassed by the appended claims.

What is claimed is:

1. A method of communicating network information, comprising:
   identifying, by a network element, a first control component within a received message, the message and the first control component having been generated according to a first protocol, the first protocol characterized by control information being embedded within packets configured to transport data;
   forwarding, by the network element to a control plane element, the first control component encapsulated within a second protocol, the second protocol characterized by control information being decoupled from the packets configured to transport data; and
   configuring, by the network element, one or more message flow paths through the network element as directed by the first control component, and transporting the message over the one or more message flow paths through the network element as directed by the first control component;
   configuring, by the network element, one or more message flow paths through the network element as directed by a second control component, the second control component being generated according to the second protocol and provided by the control plane element.

2. The method of claim 1, wherein the second control component is derived from the first control component.

3. The method of claim 1, further comprising configuring, by the network element, one or more message flow paths as directed by the first control component.

4. The method of claim 3, further comprising, by the network element, directing a first data block according to the first control component, and directing a second data block according to the second control component.

5. The method of claim 1, further including forwarding, by the network element, to the source of the received message, a message generated according to the first protocol.

6. The method of claim 1, further comprising configuring, by a second network element, one or more flow paths through the second network element according to the control component generated according to the second protocol.

7. The method of claim 1, wherein the first protocol is a legacy protocol and the second protocol is a non-legacy protocol, the legacy protocol being one or more of BGP, IS-IS, OSPF, RSUP(TE), Ethernet spanning tree, and GMPLS.

8. The method of claim 7, wherein the non-legacy protocol is a Software-Defined Networking (SDN) protocol.

9. The method of claim 8, wherein the SDN protocol is the OpenFlow protocol.

10. The method of claim 1, wherein the control plane element includes one or more controllers.

11. The method of claim 10, wherein the control plane element includes one or more orchestrators, the one or more controllers subtending the one or more orchestrators.

12. The method of claim 11, further including forwarding, by at least one of the orchestrators, the first control component to the one or more controllers.

13. The method of claim 1, further comprising acknowledging, by the network element, receipt of the second control component generated according to the second protocol.

14. A method of communicating network information, comprising:

generating, by a control plane element, a first control component associated with a first communications protocol, the first communications protocol characterized by control information being decoupled from packets configured to transport data;

distributing the first control component to one or more first communications protocol network elements that transport data using the first communications protocol, configuring one or more first communications protocol message flow paths through the first communications protocol network element as directed by the first control component, the one or more flow paths being directed to other first communications protocol network elements; and configuring one or more message flow paths through the first communications protocol network element as directed by a second control component that is conveyed by an incoming message and is associated with a second communications protocol, the second communications protocol characterized by control information being embedded within packets configured to transport data, and transporting the incoming message over the one or more message flow paths through the first communications protocol network element as directed by the second control component.

15. The method of claim 14, wherein the first control component is provided by a forwarding network element, the first control component being embedded within a message associated with the second protocol.

16. The method of claim 14, wherein the control plane element includes zero or more orchestrators and one or more controllers, the one or more controllers subtending zero or more orchestrators.

17. The method of claim 16, further including forwarding, by the orchestrator, the second control component to the one or more controllers.

18. A communications network architecture, comprising:
a first network device belonging to a first network, the first network device comprising one of a switch and a router and configured to identify a first control component having been generated according to a first protocol, the first protocol characterized by control information being embedded within packets configured to transport data;

a control plane device associated with the first network and a second network, the control plane device comprising one of a packet controller, an optical controller, and a network orchestrator and configured to derive a second control component from the first control component, the second control component being derived according to a second protocol that is characterized by control information being decoupled from packets configured to transport data;

the first network device further configured to:
receive the second control component and use the second control component to configure one or more message flow paths through the first network device; and use the first control component to configure one or more message flow paths through the first network device.

19. The communications network architecture of claim 18, wherein a second network device belonging to the second network, the second network device comprises one of a switch and a router and is configured to receive the second control component and use the second control component to configure one or more message flow paths through the second network device.

20. The communications network architecture of claim 18, further including a third network device belonging to the first network, wherein the third network device comprises one of a switch and a router and is configured to receive the second control component and use the second control component to configure one or more message flow paths through the third network device.

21. The communications network architecture of claim 18, wherein the control plane device includes zero or more orchestrators and one or more controllers, the one or more controllers subtending zero or more orchestrators.

22. An apparatus for communicating network information, comprising:
a network device comprising one of a switch and a router, the network device upon receiving a message:
(i) identifies a first control component within a received message, the message and the first control component having been generated according to a first protocol, the first protocol characterized by control information being embedded within packets configured to transport data;
(ii) forwards to a control plane element, the first control component encapsulated within a second protocol, the second protocol characterized by control information being decoupled from the packets configured to transport data;
(iii) configures one or more message flow paths through the network element as directed by a second control component, the second control component being generated according to a second protocol and provided by the control plane element; and
(iv) configures one or more message flow paths through the network element as directed by the first control component, and transport the message over the one or more message flow paths through the network element as directed by the first control plane element.

23. An apparatus for communicating network information, comprising:
a control plane device comprising one of a packet controller, an optical controller, and a network orchestrator and:
(i) generate a first control component associated with a first communications protocol, the first control component being derived from a second control component associated with a second communications protocol, the first communications protocol characterized by control information being decoupled from packets configured to transport data; and
(ii) distribute the first control component to one or more first communications protocol network devices that comprise one of a switch and a router, and that transport data using the first communications protocol, the first control component being configured to designate one or more first communications protocol message flow paths through the one or more first communications protocol network devices, the one or more network devices, each configured to designate one or more message flow paths based on a second control component associated with the second communications protocol.

* * * * *